(12) United States Patent
Maejima et al.

(10) Patent No.: US 6,181,539 B1
(45) Date of Patent: Jan. 30, 2001

(54) POWER CONVERSION APPARATUS AND AIR CONDITIONER USING THE SAME

(75) Inventors: Akihiro Maejima, Fujinomiya; Tadayuki Igarashi, Fuji; Yuji Kato, Ibaraki, all of (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/308,701

(22) PCT Filed: Sep. 9, 1998

(86) PCT No.: PCT/JP98/04047

§ 371 Date: May 20, 1999

§ 102(e) Date: May 20, 1999

(87) PCT Pub. No.: WO99/16164

PCT Pub. Date: Apr. 1, 1999

(30) Foreign Application Priority Data

Sep. 24, 1997 (JP) .................................................. 9-258946

(51) Int. Cl.[7] ...................................................... H02H 7/00
(52) U.S. Cl. ............................................................... 361/22
(58) Field of Search ................................ 361/22, 30, 31, 361/35; 318/803, 812

(56) References Cited

U.S. PATENT DOCUMENTS

| | | | |
|---|---|---|---|
| 4,736,148 | * | 4/1988 | Hirata ..................... 318/812 |
| 5,493,868 | * | 2/1996 | Kikuiri et al. ........................ 361/22 |
| 5,663,627 | * | 9/1997 | Ogawa ................................ 318/803 |

FOREIGN PATENT DOCUMENTS

| | | |
|---|---|---|
| 696 842 | 2/1996 | (EP) . |
| 697 569 | 2/1996 | (EP) . |
| 786 857 | 7/1997 | (EP) . |
| 2-299470 | 12/1990 | (JP) . |
| 7-7946 | 1/1995 | (JP) . |
| 9-266674 | 10/1997 | (JP) . |
| 10-80139 | 3/1998 | (JP) . |

OTHER PUBLICATIONS

Tollik D et al "Comparative Analysis of 1–Phase Active Power Factor Correction Topologies"Proceedings of the International Telecommunications Energy Conferen (Intelec), Washington. Oct.4–8, 1992, No. Conf. 14, Oct. 4, 1992, pp. 517–523, XP000357572 Institute of Electrical and Electronics Enginers See Figs. 1,5,3,1.

* cited by examiner

Primary Examiner—Stephen W. Jackson
Assistant Examiner—Sharon Polk
(74) Attorney, Agent, or Firm—Pillsbury Madison & Sutro LLP

(57) ABSTRACT

This invention provides a power conversion apparatus capable of improving the power factor of the power supply and making the harmonic component of the power supply match or very closer to the IEC standard, and an air conditioner using the same. The power conversion apparatus includes a conversion section for rectifying and smoothing an AC voltage supplied from an AC power supply and converting the AC voltage into a DC voltage, an inversion section for converting the DC voltage prepared by conversion into an AC voltage and supplying the AC voltage to a load, a reactor series-connected to the power supply side of the conversion section, a booster for forcibly short-circuiting the AC power supply via the reactor, and a controller for setting the short-circuiting conduction time by the booster so as to optimize the power factor of the AC power supply in accordance with any one or a plurality of differences between the voltage of the AC power supply, the inductance of the reactor, the circuit arrangement of the conversion section, and an input power. The air conditioner drives a compressor for forming a refrigeration cycle using the power conversion apparatus.

22 Claims, 13 Drawing Sheets

| INPUT POWER (W) | BOOSTING PULSE WIDTH (ms) | DC VOLTAGE (V) | POWER FACTOR (%) |
|---|---|---|---|
| 1086 | 1.9 | 254.7 | 95.3 |
| 1229 | 2.0 | 258.5 | 95.0 |
| 1315 | 2.0 | 255.7 | 96.7 |
| 1498 | 2.1 | 258.2 | 97.3 |
| 1703 | 2.2 | 259.8 | 97.9 |
| 1807 | 2.2 | 256.9 | 98.2 |
| 1948 | 2.3 | 260.2 | 98.4 |
| 2149 | 2.4 | 261.8 | 98.6 |
| 2351 | 2.5 | 264.1 | 98.8 |
| 2552 | 2.6 | 265.9 | 98.9 |
| 2673 | 2.6 | 261.6 | 99.0 |

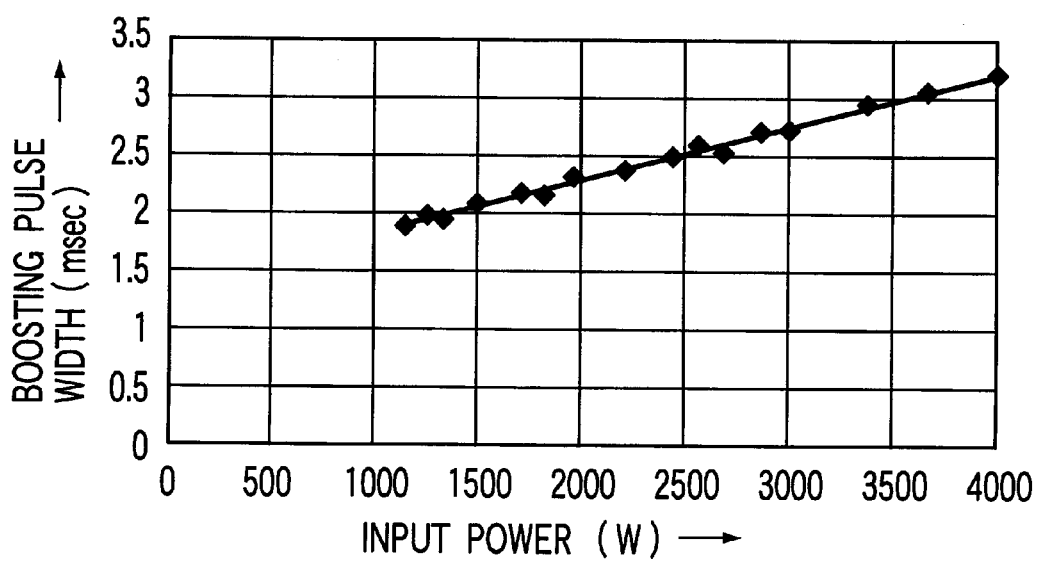
F I G. 9
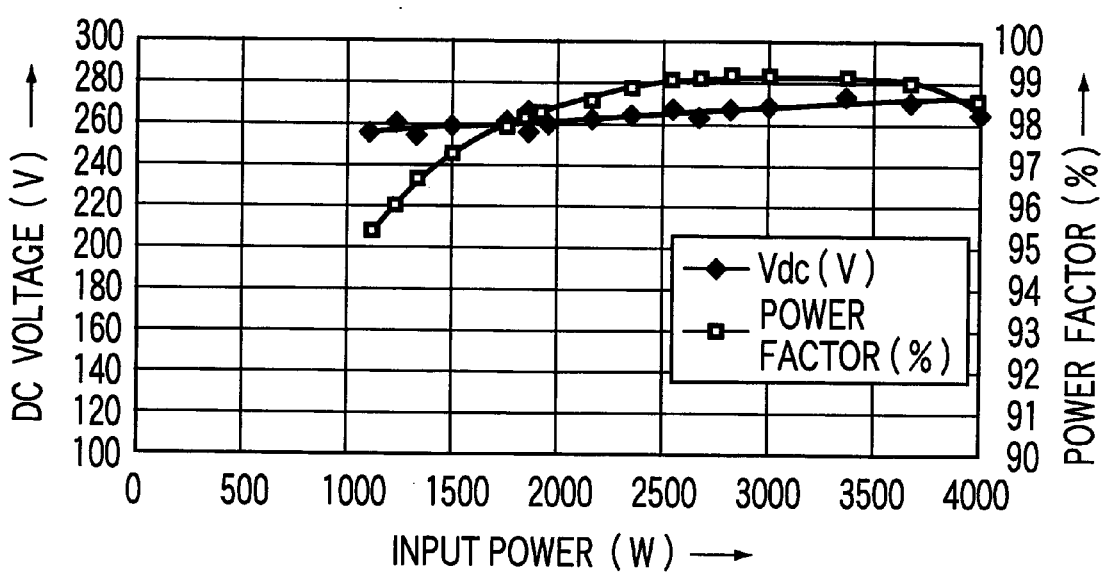
F I G. 10

POWER CONVERSION APPARATUS AND AIR CONDITIONER USING THE SAME

TECHNICAL FIELD

The present invention relates to a power conversion apparatus and an air conditioner using the same and, more particularly, to a power conversion apparatus for rectifying and smoothing an AC voltage supplied from an AC power supply, converting the AC voltage into a DC voltage, reconverting the DC voltage into an AC voltage, and supplying the obtained AC voltage to a load, and an air conditioner using the same.

BACKGROUND ART

A large-capacity power conversion apparatus for converting an AC voltage supplied from an AC power supply into a DC voltage, further converting the DC voltage into a pulse-width-modulated (PWM) voltage, and supplying the PWM voltage to a load has conventionally been known.

For example, as a power conversion apparatus for 400 W to 5 kW, a passive filter power conversion apparatus is available in which a reactor is connected to an AC power supply line, and an AC voltage obtained via the reactor is rectified by a voltage doubling/rectifying circuit in order to increase the power factor and reduce the harmonic component of the power supply (distortion of the power supply waveform).

FIG. 17 is a circuit diagram showing the arrangement of an inverter apparatus used in an air conditioner using an AC power supply voltage in 100V class, i.e., a conventional passive filter power conversion apparatus for controlling the ability of a refrigeration cycle drive motor.

As shown in FIG. 17, one terminal of a reactor Lin is connected to one terminal of an AC power supply Vin.

The other terminal of the reactor Lin is connected to the connection point between series-connected diodes DH and DL.

The series circuit made up of the diodes DH and DL is parallel-connected to the series circuit made up of diodes D1 and D2 and the series circuit made up of capacitors CH and CL.

The other terminal of the AC power supply Vin is connected to the connection point of the diodes D1 and D2 and to the connection point of the capacitors CH and CL called voltage doubling capacitors.

A smoothing capacitor CD is connected between the two terminals of the series circuit made up of the capacitors CH and CL.

The voltage across the smoothing capacitor CD is supplied to an inverter 50.

When the inverter 50 is connected to a load of about 1.8 kW, a reactor Lin having an inductance of 6.2 mH, voltage doubling capacitors CL and CH each having a capacitance of 360 pF, and a smoothing capacitor CD having a capacitance of 1,600 $\mu$F are employed.

In the positive half cycle of the AC power supply Vin, the capacitor CH is charged via the diode DH; in the negative half cycle, the capacitor CL is charged via the diode DL.

The sum of the capacitor CH charge voltage and the capacitor CL charge voltage is applied to the smoothing capacitor CD, and thus the voltage twice the AC power supply Vin is supplied to the inverter 50.

The diode D1 forms a discharge circuit so as not to reversely charge the capacitor CH at the start of charge.

The diode D2 forms a discharge circuit so as not to reversely charge the capacitor CL at the start of charge.

The diodes DH, DL, D1, and D2, the voltage doubling capacitors CH and CL, and the smoothing capacitor CD shown in FIG. 17 constitute a conversion section (to be described later) according to the present invention. The inverter 50 constitutes an inversion section (to be described later) according to the present invention.

That is, this conversion section includes a voltage doubling/rectifying circuit 45 and the voltage doubling capacitors CH and CL.

When a compressor drive motor (not shown) serving as a load is driven using the conventional power conversion apparatus, a harmonic component is generated in the power supply, as indicated by the current value in FIG. 18.

FIG. 18 shows a current I (Lin) together with a current I (IEC) in class E standard by IEC (International Electrotechnical Commission). Comparing the current I (Lin) with the current I (IEC), the third harmonic component of I (Lin) exceeds that of I (IEC).

The third harmonic component can be reduced using a reactor having a larger inductance. In this case, however, the apparatus becomes bulky.

In the power conversion apparatus shown in FIG. 17, the power factor of the power supply is as relatively low as about 93%. As the load increases, an AC input current may increase, and the current value may reach a predetermined limit value. For this reason, the rotational speed and the like of the compressor drive motor (not shown) serving as a load are often limited.

FIG. 19 is a circuit diagram showing the arrangement of an inverter apparatus used in an air conditioner using an AC power supply voltage in 200V class, i.e., a passive filter power conversion apparatus for controlling the ability of a refrigeration cycle drive motor.

As shown in FIG. 19, the series circuit made up of diodes D3 and D4 is parallel-connected between the two terminals of the series circuit made up of diodes D1 and D2 to form a known full-wave rectifying circuit 40.

One terminal of an AC power supply Vin is connected to the connection point between the diodes D1 and D2, whereas the other terminal is connected to the connection point between the diodes D3 and D4.

A power factor improvement capacitor CP is connected between the two terminals of the series-connected diode circuit, and a smoothing capacitor CD is also connected between them via a reactor Lin and a reverse-flow prevention diode DB.

The voltage across the smoothing capacitor CD is supplied to an inverter 50.

The full-wave rectifying circuit 40 by the diodes D1, D2, D3, and D4, and the smoothing capacitor CD shown in FIG. 19 constitute a conversion section (to be described later) according to the present invention. The inverter 50 constitutes an inversion section (to be described later) according to the present invention.

That is, this conversion section includes the full-wave rectifying circuit 40 and the smoothing capacitor CD.

FIG. 20 shows the voltage and current waveforms of one cycle in the power conversion apparatus shown in FIG. 19.

As shown in FIG. 20, even a conduction angle of 110° leads to a power factor of only 90%. Compared to an AC power supply voltage in 100V class, an AC input current hardly reaches a limit value for the same input power.

However, the power factor is lower than in the power supply in 100V class. To increase the power factor, a reactor having a larger inductance must be used, resulting in a bulky apparatus.

DISCLOSURE OF INVENTION

The present invention has been made to solve the above drawbacks, and has as its object to provide a power conversion apparatus capable of increasing the power factor of the power supply and making the harmonic component of the power supply match or very closer to the IEC standard.

It is another object of the present invention to provide an air conditioner using the power conversion apparatus capable of increasing the power factor of the power supply and making the harmonic component of the power supply match or very closer to the IEC standard.

To achieve the above objects, according to the first aspect of the present invention, there is provided a power conversion apparatus characterized by comprising;

- a conversion section for rectifying and smoothing an AC voltage supplied from an AC power supply and converting the AC voltage into a DC voltage,
- an inversion section for converting the DC voltage converted by the conversion section into an AC voltage and supplying the AC voltage to a load,
- a reactor series-connected to the AC power supply side in the conversion section the reactor having an inductance of 4 to 20 mH,
- a booster for forcibly short-circuiting the AC power supply via the reactor, and
- a controller for controlling a short-circuiting conduction time of the AC power supply by the booster, within a range of 1.5 to 3.5 msec so as to optimize a power factor of the AC power supply.

To achieve the above objects, according to the second aspect of the present invention, there is provided a power conversion apparatus defined in the first aspect, characterized in that when the AC power supply voltage is in 100V class, the inductance of the reactor is 4 to 8 mH, the conversion section comprises a voltage doubling/rectifying circuit and a voltage doubling capacitor having a capacitance of 600 to 1,000 $\mu$F, and the input power is not more than 2,000 W, the controller controls the short-circuiting conduction time of the AC power supply within a range of 1.5 to 3.5 msec.

To achieve the above objects, according to the third aspect of the present invention, there is provided a power conversion apparatus defined in the first aspect, characterized in that when the AC power supply voltage is in 200V class, the inductance of the reactor is 8 to 20 mH, the conversion section comprises a full-wave rectifying circuit and a smoothing capacitor having a capacitance of 1,400 to 1,800 $\mu$F, and the input power is not more than 2,000 W, the controller controls the short-circuiting conduction time of the AC power supply within a range of 1.5 to 3.5 msec.

To achieve the above objects, according to the fourth aspect of the present invention, there is provided a power conversion apparatus defined in the first aspect, characterized in that when the AC power supply voltage is in 200V or 230V class, and the input power is 2,000 to 4,000 W, the reactor has an inductance of 14 to 20 mH.

To achieve the above objects, according to the fifth aspect of the present invention, there is provided a power conversion apparatus defined in the fourth aspect, characterized in that the reactor has an inductance of 16 mH, and the controller controls the short-circuiting conduction time of the AC power supply within a range of about 2.0 to 2.5 msec for an input power of 2,000 W, within a range of about 3.0 to 3.5 msec for an input power of 4,000 W, and for only a time obtained by linearly interpolating the short-circuiting conduction time for an intermediate input power of 2,000 to 4,000 W.

To achieve the above objects, according to the sixth aspect of the present invention, there is provided a power conversion apparatus defined in the first aspect, characterized in that the reactor includes a plurality of reactors substantially equal in at least one of a shape, an inductance, and a natural frequency so as to obtain a predetermined synthesized inductance upon series connection.

To achieve the above objects, according to the seventh aspect of the present invention, there is provided a power conversion apparatus defined in the sixth aspect, characterized in that when the AC power supply is in 200V class, and the input power is 2,000 to 4,000 W, the plurality of reactors have a synthesized inductance of 14 to 20 mH.

To achieve the above objects, according to the eighth aspect of the present invention, there is provided a power conversion apparatus defined in the sixth aspect, characterized in that the reactor includes first and second reactors substantially equal in inductance and natural frequency, the first reactor is connected to one power supply path for connecting the conversion section to the AC power supply, and the second reactor is connected to the other power supply path for connecting the conversion section to the AC power supply.

To achieve the above objects, according to the ninth aspect of the present invention, there is provided a power conversion apparatus defined in the seventh aspect, characterized in that the reactor includes first and second reactors substantially equal in inductance and natural frequency, the first reactor is connected to one power supply path for connecting the conversion section to the AC power supply, and the second reactor is connected to the other power supply path for connecting the conversion section to the AC power supply.

To achieve the above objects, according to the 10th aspect of the present invention, there is provided a power conversion apparatus defined in any one of the first to ninth aspects, characterized in that after the booster short-circuits the AC power supply for a predetermined time, the booster short-circuits the AC power supply again for only a time shorter than the predetermined time.

To achieve the above objects, according to the 11th aspect of the present invention, there is provided an air conditioner characterized by driving a compressor for forming a refrigeration cycle using the power conversion apparatus defined in any one of the first to ninth aspects.

To achieve the above objects, according to the 12th aspect of the present invention, there is provided an air conditioner defined in the 11th aspect, characterized in that the compressor stops after a short-circuiting conduction operation of the booster stops in stopping operation.

To achieve the above objects, according to the 13th aspect of the present invention, there is provided an air conditioner defined in the 11th aspect, characterized in that the air conditioner comprises current detection means for detecting an input current supplied from the AC power supply, the controller decreases a power supply frequency for driving the compressor when the input current detected by the current detection means exceeds a predetermined limit value, and an interval in which a frequency is kept constant using the limit value as an upper limit is set on a side having a current smaller than the limit value.

To achieve the above objects, according to the 14th aspect of the present invention, there is provided an air conditioner defined in the 12th aspect, characterized in that the air conditioner comprises current detection means for detecting an input current supplied from the AC power supply, the controller decreases a power supply frequency for driving the compressor when the input current detected by the current detection means exceeds a predetermined limit value, and an interval in which a frequency is kept constant using the limit value as an upper limit is set on a side having a current smaller than the limit value.

To achieve the above objects, according to the 15th aspect of the present invention, there is provided an air conditioner defined in the 13th aspect, characterized in that a lower limit of the interval in which the frequency is kept constant serves as constant frequency control start and cancel points.

To achieve the above objects, according to the 16th aspect of the present invention, there is provided an air conditioner defined in the 14th aspect, characterized in that a lower limit of the interval in which the frequency is kept constant serves as constant frequency control start and cancel points.

To achieve the above objects, according to the 17th aspect of the present invention, there is provided an air conditioner characterized by driving a compressor for forming a refrigeration cycle using the power conversion apparatus defined in the 10th aspect.

To achieve the above objects, according to the 18th aspect of the present invention, there is provided an air conditioner defined in the 17th aspect, characterized in that the compressor stops after a short-circuiting conduction operation of the booster stops in stopping operation.

To achieve the above objects, according to the 19th aspect of the present invention, there is provided an air conditioner defined in the 17th aspect, characterized in that the air conditioner comprises current detection means for detecting an input current supplied from the AC power supply, the controller decreases a power supply frequency for driving the compressor when the input current detected by the current detection means exceeds a predetermined limit value, and an interval in which a frequency is kept constant using the limit value as an upper limit is set on a side having a current smaller than the limit value.

To achieve the above objects, according to the 20th aspect of the present invention, there is provided an air conditioner defined in the 18th aspect, characterized in that the air conditioner comprises current detection means for detecting an input current supplied from the AC power supply, the controller decreases a power supply frequency for driving the compressor when the input current detected by the current detection means exceeds a predetermined limit value, and an interval in which a frequency is kept constant using the limit value as an upper limit is set on a side having a current smaller than the limit value.

To achieve the above objects, according to the 21st aspect of the present invention, there is provided an air conditioner defined in the 19th aspect, characterized in that a lower limit of the interval in which the frequency is kept constant serves as constant frequency control start and cancel points.

To achieve the above objects, according to the 22nd aspect of the present invention, there is provided an air conditioner defined in the 20th aspect, characterized in that a lower limit of the interval in which the frequency is kept constant serves as constant frequency control start and cancel points.

BRIEF DESCRIPTION OF DRAWINGS

FIG. 9 is a graph showing the relationship between the input power and the boosting pulse width for explaining the operation of the second embodiment of the present invention;

FIG. 10 is a graph showing the relationship between the input power, the DC voltage, and the power factor for explaining the operation of the second embodiment of the present invention;

BEST MODE OF CARRYING OUT THE INVENTION

Preferred embodiments of the present invention will be described in detail below with reference to the accompanying drawings.

Figure 1:
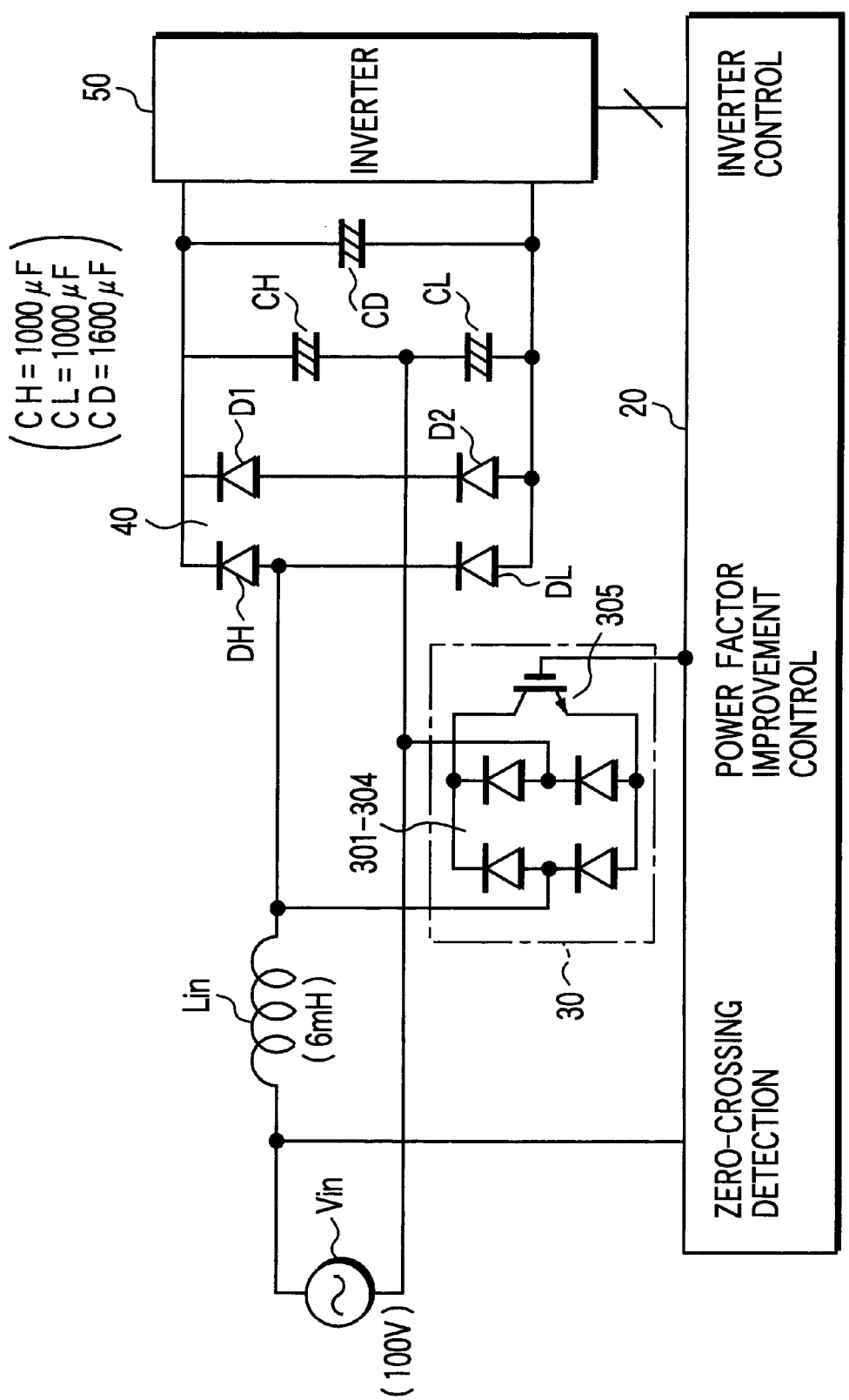
FIG. 1 is a circuit diagram showing the arrangement of the first embodiment of a power conversion apparatus according to the present invention.

FIG. 1 is a circuit diagram showing the arrangement of the first embodiment of a power conversion apparatus according to the present invention.

Figure 17:
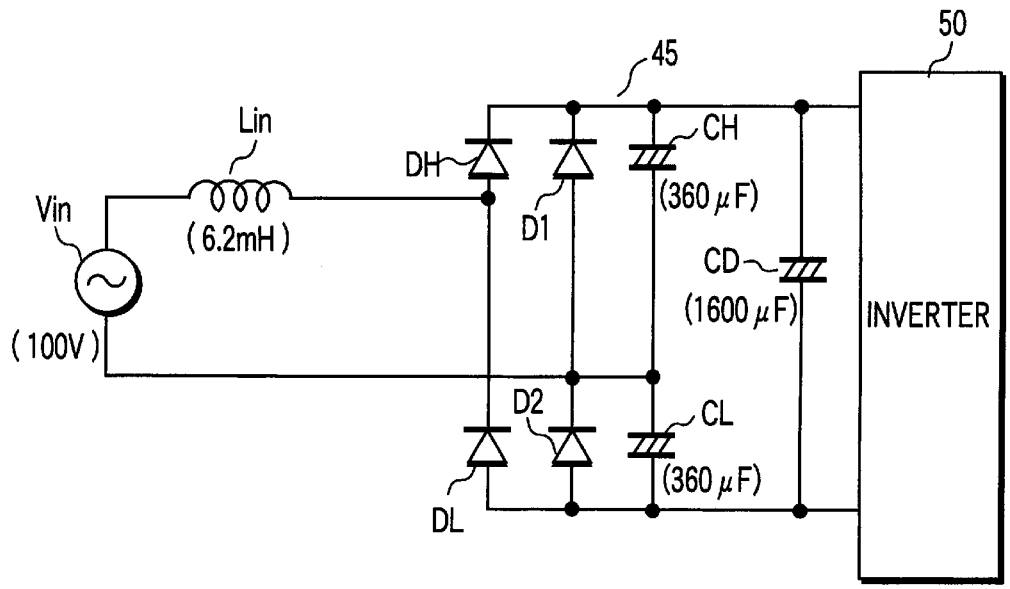
FIG. 17 is a circuit diagram showing the arrangement of a conventional power conversion apparatus used in the air conditioner.
Figure 18:
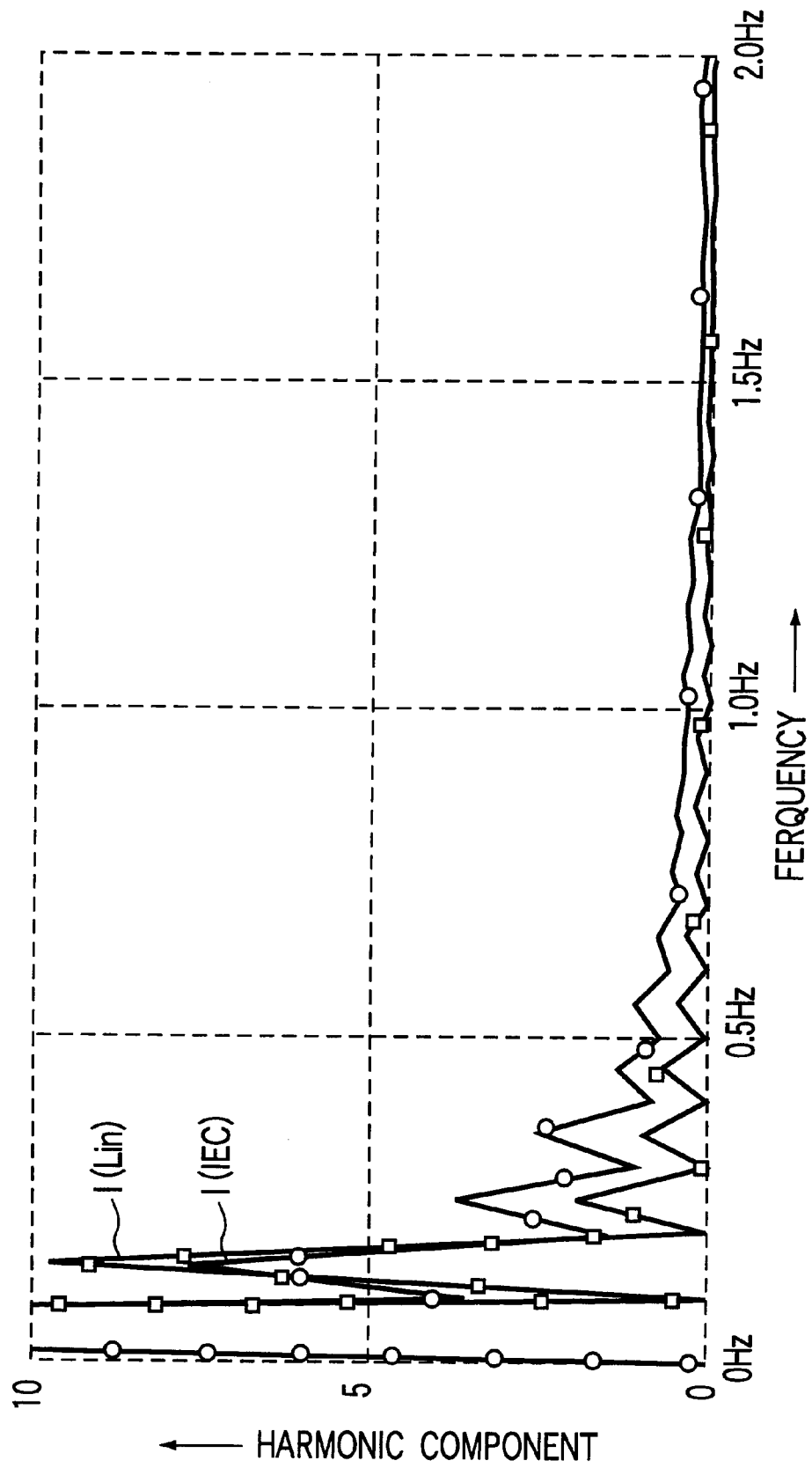
FIG. 18 is a graph showing generation of the harmonic component of the power supply upon driving the compressor using the power conversion apparatus shown in FIG. 17, together with class E standard by IEC (International Electrotechnical Commission)
Figure 19:
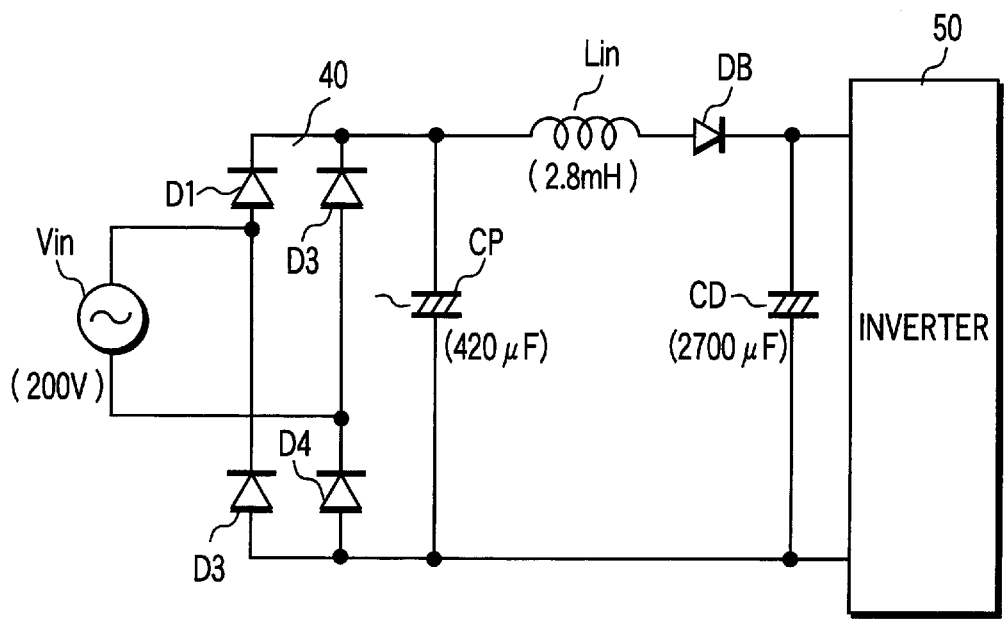
FIG. 19 is a circuit diagram showing the arrangement of another conventional power conversion apparatus used in the air conditioner.
Figure 20:
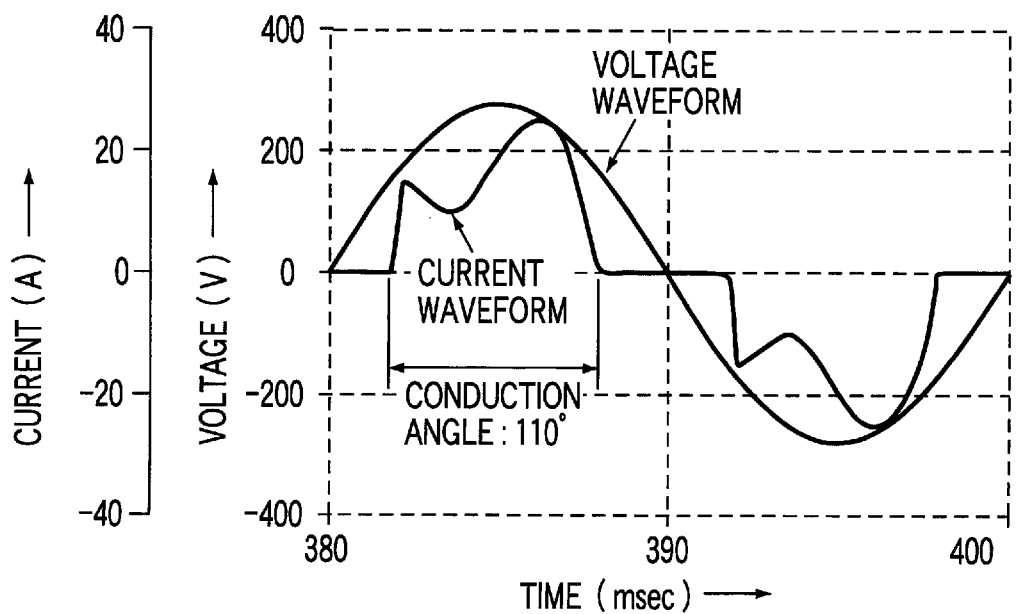
FIG. 20 is a waveform chart showing changes in input current with respect to the power supply voltage upon driving the compressor using the power conversion apparatus shown in FIG. 19.

The same reference numerals as in FIG. 17 showing a conventional apparatus including a conversion section and an inversion section according to the present invention, as described above, denote the same parts in FIG. 1, and a description thereof will be omitted.

In the first embodiment, a booster 30 is connected between the load terminal of a reactor Lin connected to one terminal of an AC power supply Vin, and the other terminal of the AC power supply Vin.

An outdoor controller 20 serving as a control unit including a microcontrol unit (MCU) detects the zero-crossing point of the AC power supply Vin, and controls the booster 30 and an inverter 50.

The booster 30 is made up of four bridge-connected diodes 301 to 304 and one insulated-gate bipolar transistor (IGBT) 305.

The four diodes 301 to 304 constitute a full-wave rectifying circuit. The AC input terminal of the full-wave rectifying circuit is connected to a power supply line on the load side viewed from the reactor Lin, and the DC output terminal thereof is connected to the IGBT 305.

When the outdoor controller 20 turns on the IGBT 305, the AC power supply Vin is short-circuited via the reactor Lin, and its energy is stored in the reactor Lin.

When the outdoor controller 20 turns off the IGBT 305, the energy stored in the reactor Lin moves to voltage doubling capacitors CH and CL.

In this case, when the power supply short-circuited and conducted for a predetermined time from the zero-crossing point, the conduction of the current waveform increases and the power factor is improved.

In the first embodiment, the reactor Lin has an inductance of 6 mH, the voltage doubling capacitors CH and CL have a capacitance of 1,000 μF, and a smoothing capacitor CD has a capacitance of 1,600 AμF.

Figure 2:
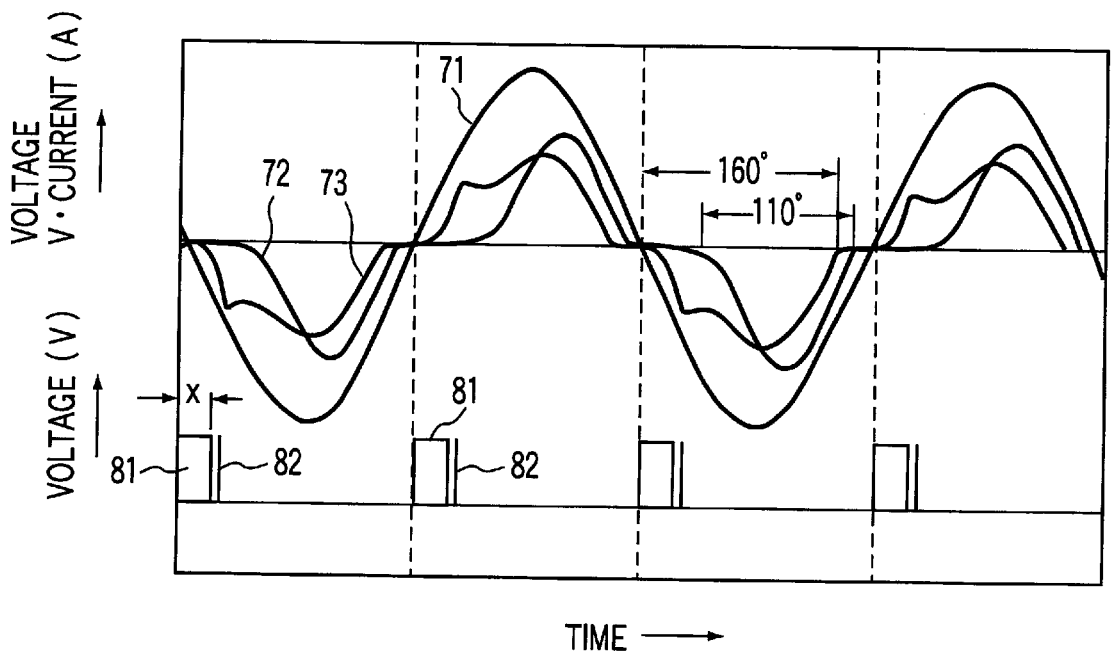
FIG. 2 is a waveform chart of the voltage and the current for explaining the operation of the first embodiment of the present invention.

FIG. 2 is a waveform chart showing a current waveform 73 corresponding to a power supply voltage waveform 71 upon short-circuiting and conducting power supply for improving the power factor, together with a current waveform 72 when no booster is arranged.

More specifically, the AC voltage of the AC power supply Vin is assumed to have a sine waveform. A boosting pulse 81 is supplied for a predetermined time (to be referred to as a short-circuiting conduction time hereinafter) X from the zero-crossing point (or upon the lapse of a given delay time), thereby short-circuiting the AC power supply Vin via the reactor Lin.

The current cannot have a perfect sine waveform, but can flow even in the phase interval immediately after the zero-crossing point in which no current flows in the conventional apparatus.

As a result, the conduction angle of the power supply current widens from 110° to 160°, and the power supply current use efficiency increases, resulting in a high power factor.

The short-circuiting conduction time is properly selected in accordance with a load or an input power so as to rectify the current waveform. As will be described later, the short-circuiting conduction time is about 2 msec for an input power of 1,000 W and about 3.3 msec for an input power of 4,000 W. For an intermediate input power, the short-circuiting conduction time is set to a value obtained by linearly interpolating these times.

Short-circuiting and conducting the power supply by the boosting pulse 81 causes the reactor to generate uncomfortable noise "ziee". To reduce this noise, a noise reduction pulse 82 is supplied to the booster 30 subsequent to the boosting pulse 81.

Figure 3:
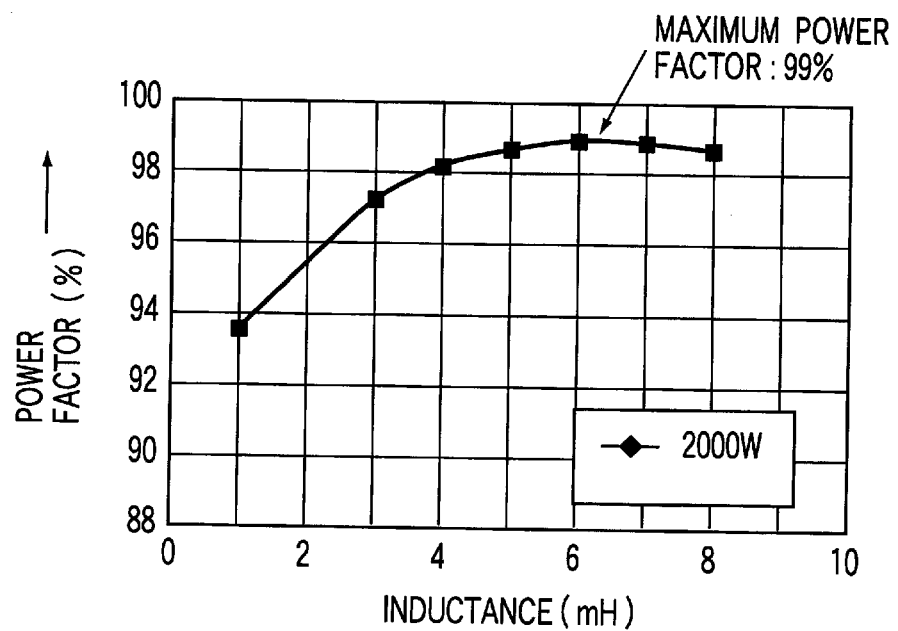
FIG. 3 is a graph showing the relationship between the inductance of a reactor and the power factor for explaining the operation of the first embodiment of the present invention.

FIG. 3 shows changes in power factor upon sequentially switching reactors having different inductances for an input power of 2,000 W.

In FIG. 3, the power factor changes to about 94% for an inductance of 1 mH, about 98% for 4 mH, 99% for 6 mH, and about 98.5% for 8 mH. The power factor is maximum for an inductance of 6 mH.

From the experimental results, obtaining a power factor of 98% or more for an input power of, e.g., 2,000 W requires a reactor having an inductance of 4 mH or more. To maximize the power factor angle, a reactor having an inductance of 6 mH is apparently employed.

However, to rectify an AC power supply voltage in 100V class by a voltage doubling/rectifying circuit, smooth the voltage by a smoothing capacitor having a capacitance of about 1,600 μF, and keep the power factor of the power supply at, e.g., 98% or more for an input power of 2,000 W or less, a voltage doubling capacitor having a capacitance of 600 to 1,400 μF must be used, and the short-circuiting conduction time must be set to 1.5 to 3.5 msec.

When these circuit constants are adopted, the harmonic component of the power supply is confirmed by calculations to match the limit value of IEC class E, but a description thereof will be omitted.

According to the first embodiment, a power conversion apparatus capable of improving the power factor of the power supply and making the harmonic component of the power supply match the IEC standard can be obtained.

Figure 4:
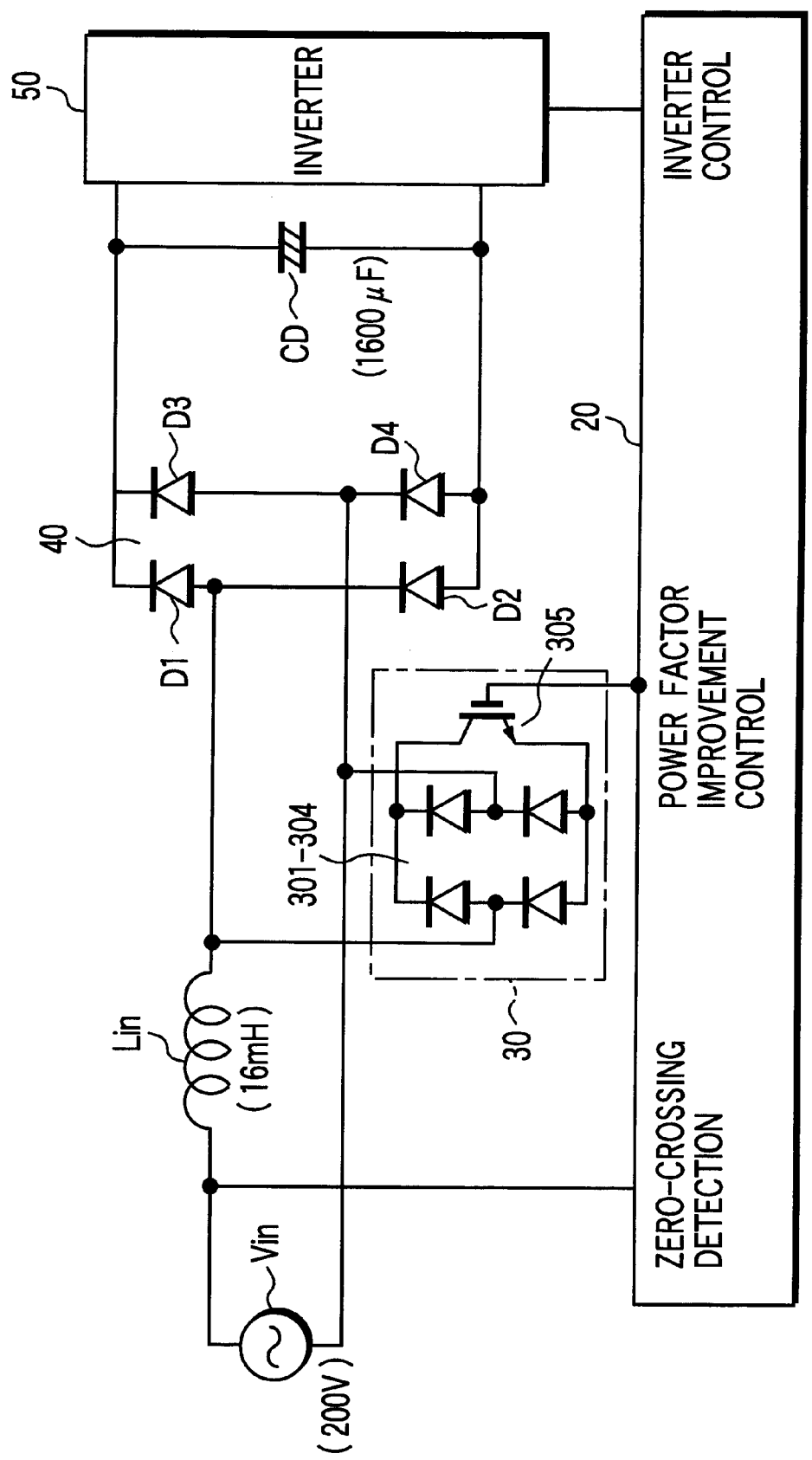
FIG. 4 is a circuit diagram showing the arrangement of the second embodiment of a power conversion apparatus according to the present invention.

FIG. 4 is a circuit diagram showing the arrangement of the second embodiment of a power conversion apparatus according to the present invention.

In the second embodiment, the AC power supply voltage is in 200V class. The same reference numerals as in FIG. 17 showing a conventional apparatus denote the same parts in FIG. 4, and a description thereof will be omitted.

In the second embodiment, similar to the case of the AC power supply voltage in 100V class, a reactor Lin is connected between an AC power supply Vin and the AC terminal of a full-wave rectifying circuit made up of bridge-connecting diodes 301 to 304.

The AC input terminal of a booster 30 is connected to the load terminal of the reactor Lin, and the DC output terminal thereof is connected to an IGBT 305.

An outdoor controller 20 including a microcontrol unit (MCU) detects the zero-crossing point of the AC power supply Vin, and controls the IGBT 305 of the booster 30 and an inverter 50.

Figure 5:
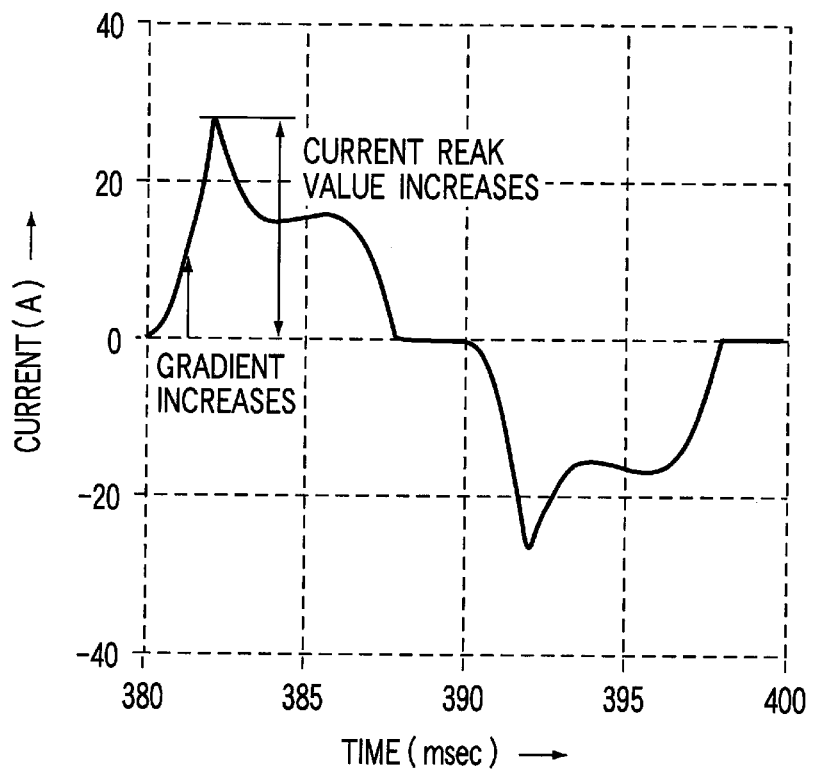
FIG. 5 is a graph showing the relationship between the time and the current for explaining the operation of the second embodiment of the present invention.

The power conversion apparatus shown in FIG. 4 processes a large load, i.e., a large input power. FIG. 5 shows the simulation results of the relationship between the time and the current.

Upon operating the booster 30, the current peak value increases along with an increase in input power, the power supply voltage doubles, and the current has a steep waveform gradient.

The power factor in this case is 94%, which is higher than an upper limit of 90% in the conventional apparatus but is still low.

Figure 6:
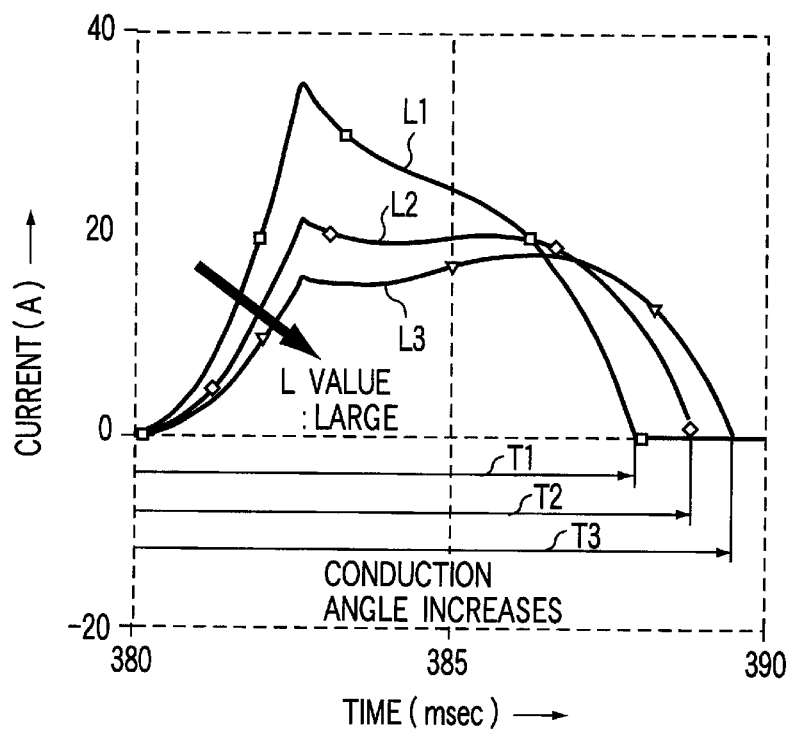
FIG. 6 is a graph showing the relationship between the time and the current for explaining the operation of the second embodiment of the present invention.

For this reason, while the inductance value of the reactor Lin is variously changed, the relationship between the time and the current is simulated and experimentally confirmed to obtain the results shown in FIG. 6.

More specifically, as the value of the reactor Lin is sequentially changed to L1<L2<L3, the current peak value and the time change rate decrease. At the same time, the conduction sequentially widens to T1<T2<T3, and thus the power factor is improved.

Figures 7, 8:
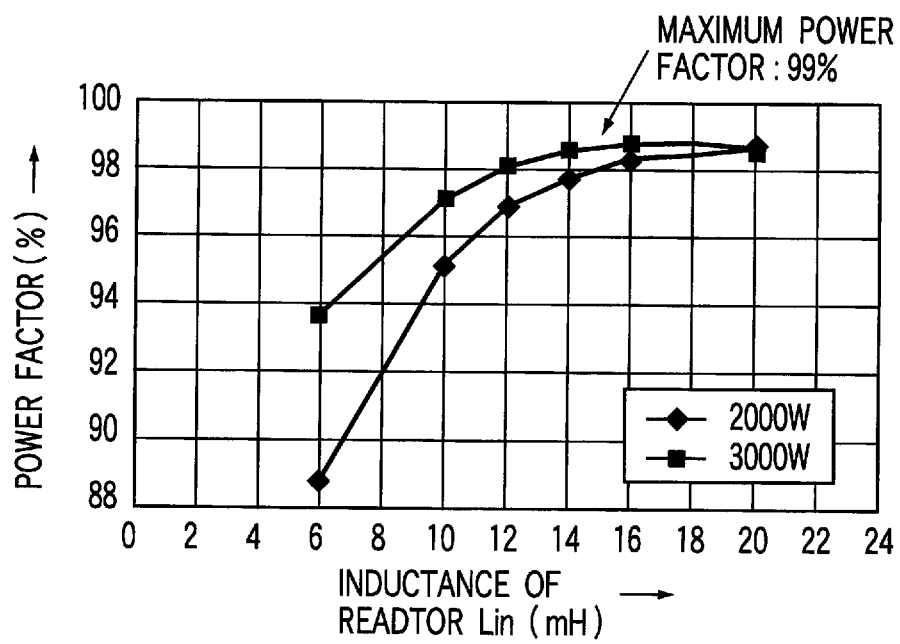
FIG. 7 is a graph showing the relationship between the inductance of the reactor and the power factor for explaining the operation of the second embodiment of the present invention.
FIG. 8 is a table showing the relationship between the input power, the boosting pulse width, and the power factor for explaining the operation of the second embodiment of the present invention.

FIG. 7 shows the results of measurement using several reactors having different inductances, i.e., the relationship between the inductance of the reactor Lin and the power factor using an input power as a parameter.

In FIG. 7, for an input power of 2,000 W, the power factor is measured at typical inductance values from 6 mH to 20 mH in the reactor Lin, and confirmed to change from about 92.4% to 98.8% and reach a maximum power factor of 99% at an inductance of 16 mH in the reactor Lin.

To obtain a power factor of 98% or more, the reactor Lin must have an inductance of 14 mH to 20 mH.

For an input power of 3,000 W, the power factor is measured at typical inductance values from 6 mH to 20 mH in the reactor Lin, and confirmed to change from about 88.5% to 98.8%. By using the reactor Lin having an inductance of 14 to 20 mH, the power factor can be maintained at 98% or more.

However, to rectify an AC power supply voltage in 200V class by a full-wave rectifying circuit, smooth the voltage by a smoothing capacitor having a capacitance of 1,600 $\mu$F (or 1,400 to 1,800 $\mu$F), and maintain the power factor of the power supply at 98% or more for an input power of 2,000 W to 4,000 W, a reactor having an inductance of 14 to 20 mH must be used, and the short-circuiting conduction time must be set to about 2.0 to 2.5 msec for an input power of 2,000 W and 3 to 3.5 msec for an input power of 4,000 W.

FIG. 8 is a table showing the relationship between the boosting pulse width (short-circuiting conduction time) X, the DC voltage, and the power factor for typical input power values from 1,086 W to 2,673 W while the inductance of the reactor Lin is fixed to 16 mH on the basis of the above experimental results.

The input power and the boosting pulse width have a linear relationship, as shown in FIG. 9.

Letting X (msec) be the boosting pulse width, and $P_{IN}$ (W) be the input power, they satisfy the approximate expression:

$$X = 0.0005 \times P_{IN} + 1.41 \quad (1)$$

This approximate expression determines the boosting pulse width X for an input power of 1,000 W or less, or 3,000 W or more.

This approximate expression is experimentally confirmed to be applicable to a power supply voltage in 100V class. For example, the boosting pulse width X is 2.41 msec for an input power of 2,000 W and 1.61 msec for an input power of 400 W.

In practice, since these calculation values can be given a margin to a certain degree, a boosting pulse width of about 1.5 to 3.5 msec is adopted for an input power of 2,000 W or less.

FIG. 10 is a graph showing the relationship between the input power, the DC voltage, and the power factor in the power conversion apparatus (power supply in 200V class) according to the second embodiment shown in FIG. 4.

As is apparent from FIG. 10, the DC voltage for a maximum power factor at each input power is kept at substantially 260V.

In other words, the maximum power factor can be ensured by controlling the boosting pulse width X so as to maintain the DC voltage at 260V.

As the input power decreases, the power factor decreases because calculation is performed while giving importance to a power factor at an input power of 2,600 W. Therefore, this can be improved by changing the constant of the reactor.

The above description concerns the second embodiment shown in FIG. 4, i.e., the relationship between the input power, the boosting pulse width, the DC voltage, and the power factor when the input power supply voltage is in 200V class, the full-wave rectifying circuit is used as a conversion section, and the smoothing capacitor has a capacitance of 1,600 $\mu$F.

The harmonic component of the power supply in the second embodiment will be explained.

Figure 11:
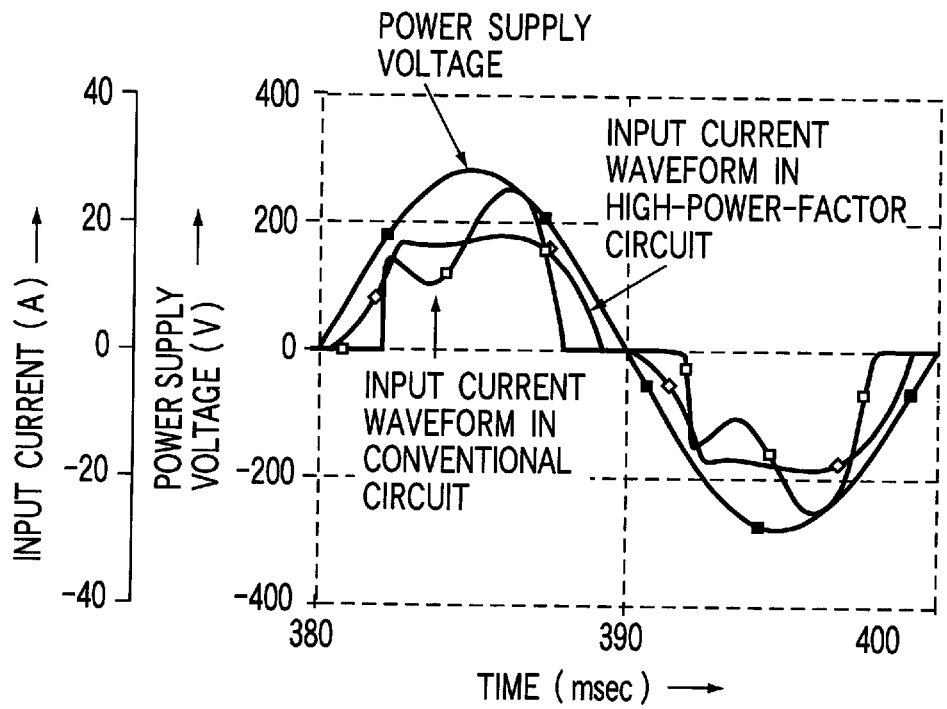
FIG. 11 is a waveform chart showing changes in input current with respect to the power supply voltage for explaining the operation of the second embodiment of the present invention.

As shown in FIG. 11, when the AC power supply voltage changes with a sine waveform, the current in the conventional power conversion apparatus shown in FIG. 17 abruptly increases at time after a predetermined time from the zero-crossing point. Then, the current temporarily decreases, increases to a maximum value, decreases to 0 at time long before the next zero-crossing point, and remains 0 until a negative current flows in the next half cycle.

Compared to the conventional apparatus, in the second embodiment which achieves a high power factor by arranging the booster, the current increases at time near the zero-crossing point, then decreases slightly, and becomes 0 at time much nearer to the next zero-crossing point.

The voltage current waveforms shown in FIG. 11 correspond to an input power of 2,500 W. These current waveforms are Fourier-analyzed to obtain the harmonic component analysis results shown in FIG. 12.

Figure 12:
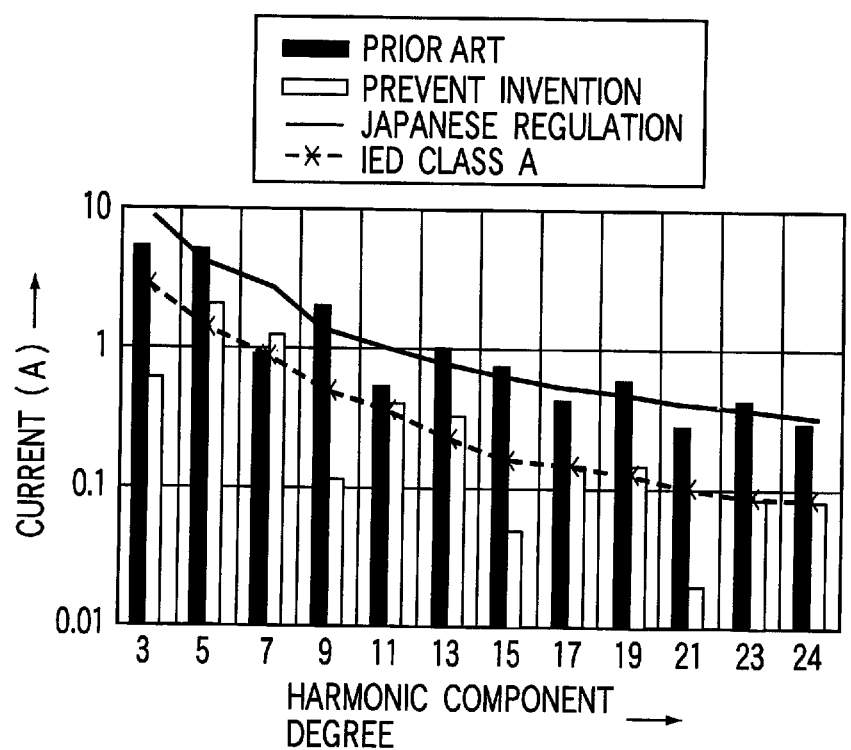
FIG. 12 is a graph showing the relationship between the harmonic component analysis results of a conventional apparatus and the second embodiment, the Japanese relaxation value, and the limit value in IEC class A for explaining the operation of the second embodiment of the present invention.

FIG. 12 shows the harmonic component analysis results of the conventional apparatus and the second embodiment, the Japanese relaxation value, and the limit value in IEC class A for the power supply voltage in 200V class and an input power of 2,500 W.

As is apparent from FIG. 12, the harmonic component in the conventional apparatus does not match even the Japanese relaxation value.

However, the harmonic component in the second embodiment is greatly improved in comparison with the harmonic component in the conventional apparatus, and has a margin of at least 44% or more from the Japanese relaxation value.

The analyzed harmonic component in the second embodiment exceeds the limit value in IEC class A because the IEC standard itself is under deliberation, and thus the harmonic component is not made to match the IEC standard.

The harmonic component is, however, confirmed by calculations to match the limit value in IEC class E with the above circuit constants.

Figure 13A:
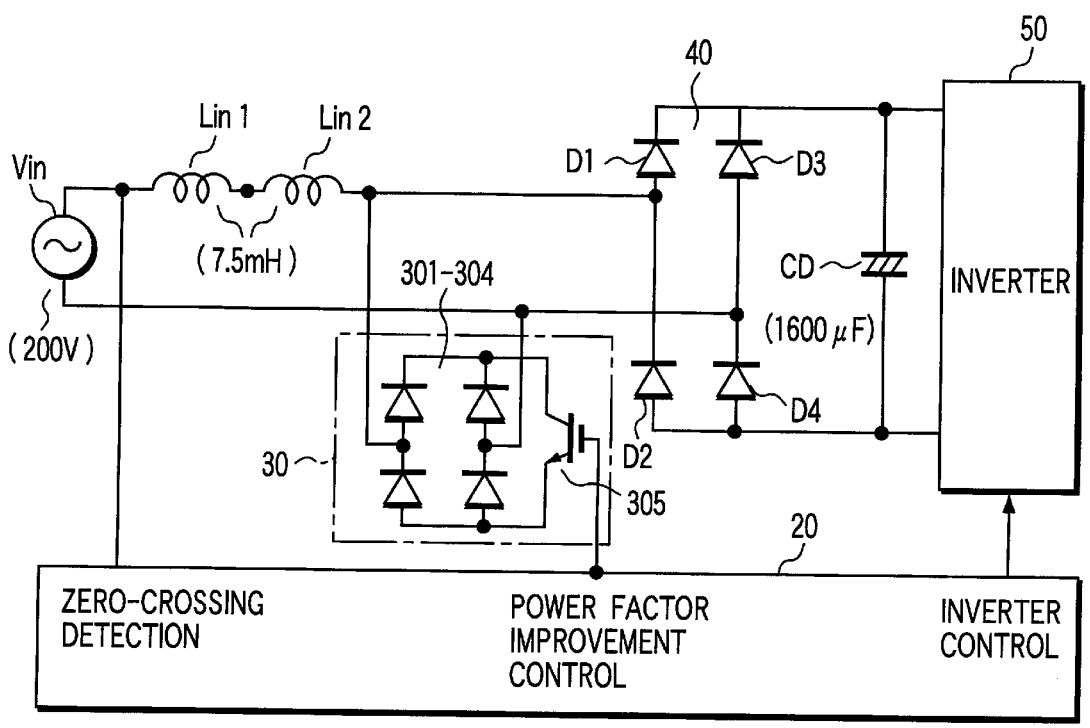
FIGS. 13A and 13B are a circuit diagram showing the arrangement of the third embodiment of a power conversion apparatus according to the present invention, and a waveform chart of a power factor improvement control pulse, respectively.
Figure 13B:
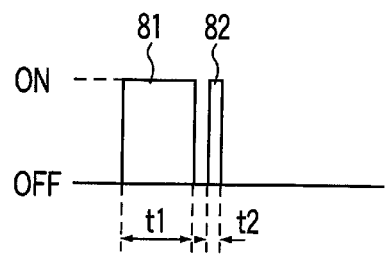

FIGS. 13A and 13B are a circuit diagram showing the arrangement of the third embodiment of a power conversion apparatus according to the present invention, and a waveform chart of a power factor improvement control pulse, respectively.

The same reference numerals as in FIG. 4 denote the same parts in FIG. 13A, and a description thereof will be omitted.

If one reactor as the reactor Lin shown in FIG. 4 is given a predetermined inductance, e.g., an inductance of 14 to 20 mH, the power conversion apparatus of the third embodiment increases in size and weight, and may generate large frequency noise.

Using a reactor having such an inductance makes it relatively difficult to manufacture and handle the power conversion apparatus and reduce noise.

In the third embodiment, as shown in FIG. 13A, first and second reactors Lin1 and Lin2 are series-connected in consideration of these situations.

Each of the first and second reactors Lin1 and Lin2 has an inductance of 7.5 mH, and has substantially the same shape and natural frequency.

Using the two series-connected reactors Lin1 and Lin2 facilitates the manufacture and handling of the power conversion apparatus.

As shown in FIG. 13B, the time width t1 of a boosting pulse 81 is determined in correspondence with a reactor having an inductance of 15 mH.

To the contrary, as shown in FIG. 13B, the time width t2 of a noise reduction pulse 82 is determined in correspondence with a reactor having an inductance of 7.5 mH.

Note that even if any one of the inductance, shape, and natural frequency of the first and second reactors Lin1 and Lin2 is the same, and the remaining two are different, the size and weight of the power conversion apparatus can be reduced.

In this case, however, the apparatus design is limited, or the time width t2 of the noise reduction pulse 82 must be set to an intermediate value optimum for the respective reactors. Accordingly, noise may not be effectively reduced.

The first and second reactors Lin1 and Lin2, therefore, advantageously have the same inductance, shape, and natural frequency.

Figure 14A:
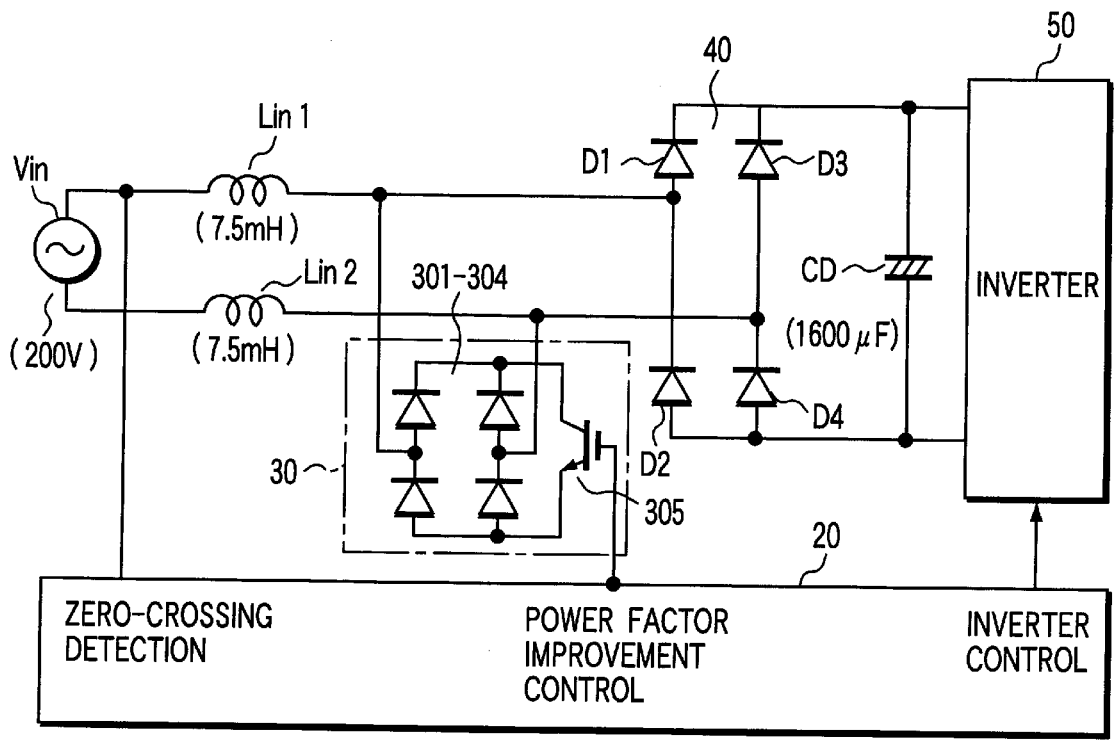
FIGS. 14A and 14B are a circuit diagram showing the arrangement of the fourth embodiment of a power conversion apparatus according to the present invention, and a waveform chart of a power factor improvement control pulse, respectively.
Figure 14B:
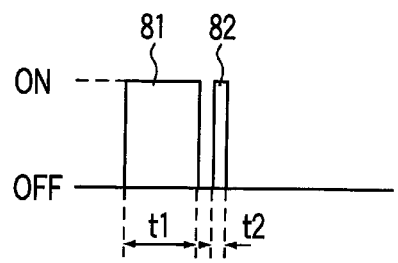

FIGS. 14A and 14B are a circuit diagram showing the arrangement of the fourth embodiment of a power conversion apparatus according to the present invention, and a waveform chart of a power factor improvement control pulse, respectively.

The same reference numerals as in FIG. 13A denote the same parts in FIG. 14A, and a description thereof will be omitted.

In the fourth embodiment, a first reactor Lin1 is connected to one path for connecting a full-wave rectifying circuit 40 made up of diodes D1 to D4 to an AC power supply Vin, whereas a second reactor Lin2 is connected to the other path.

As shown in FIG. 14B, the time width t1 of a boosting pulse 81 is determined in correspondence with a reactor having an inductance of 15 mH.

To the contrary, as shown in FIG. 14B, the time width t2 of a noise reduction pulse 82 is determined in correspondence with a reactor having an inductance of 7.5 mH.

This facilitates the manufacture and handling of a necessary reactor and noise reduction.

In the fourth embodiment shown in FIGS. 14A and 14B, since the first and second reactors Lin1 and Lin2 having the same inductance are distributively arranged on a pair of power supply paths, they can function as a line filter generally called a "common mode filter".

Figure 15:
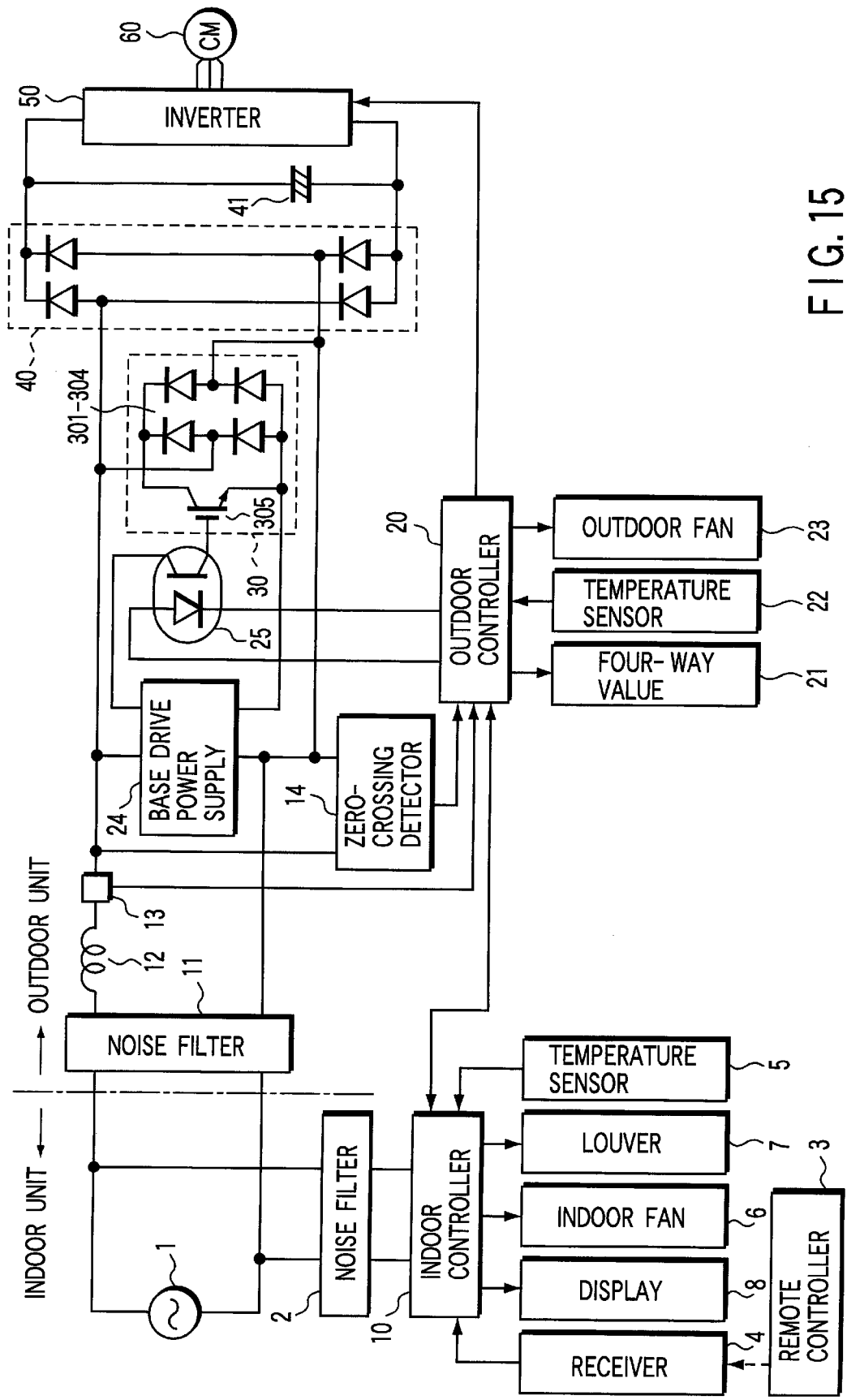
FIG. 15 is a circuit diagram showing the arrangement of an embodiment of an air conditioner using the power conversion apparatus according to the second embodiment of the present invention to drive a compressor for forming a refrigeration cycle.

FIG. 15 is a partially block diagram showing the overall arrangement of an embodiment of an air conditioner according to the present invention.

This air conditioner is constituted by indoor and outdoor units. The indoor unit is connected to an AC power supply 1.

In the indoor unit, an operation power is supplied from the AC power supply 1 via a noise filter 2 to an indoor controller 10 incorporating a microcontrol unit (MCU).

The indoor controller 10 is connected to a receiver 4 for receiving commands from a remote controller 3, a temperature sensor 5 for detecting room temperature, an indoor fan 6 for circulating air via an indoor heat exchanger (not shown), a louver 7 for changing the air discharge direction, and a display 8 for displaying the operation state.

In the outdoor unit, an operation power is supplied from the AC power supply 1 via a noise filter 11 to an outdoor controller 20 and a compressor drive motor 60.

For the sake of illustrative simplicity, a feed line to the outdoor controller 20 is not illustrated.

One load-side output terminal of the noise filter 11 is connected to one AC input terminal of a full-wave rectifying circuit 40 via a reactor 12 and a current detector 13.

The other load-side output terminal of the noise filter 11 is connected to the other AC input terminal of the full-wave rectifying circuit 40.

A zero-crossing detector 14 for detecting the zero-crossing point of an AC voltage is connected to the load-side AC power supply line of the current detector 13.

A current detection signal by the current detector 13 and a zero-crossing detection signal by the zero-crossing detector 14 are supplied to the outdoor controller 20.

The outdoor controller 20 is connected to the indoor controller 10 via a signal line for exchanging signals.

A base drive power supply 24 and a booster 30 are connected to the AC power supply between the load side of the current detector 13 and the full-wave rectifying circuit 40.

The base drive power supply 24 ON/OFF-controls the booster 30. When the outdoor controller 20 supplies an ON signal to the light-emitting element of a photocoupler 25, the base drive power supply 24 turns on an IGBT 305 of the booster 30 via a light-receiving element.

The outdoor controller 20 is further connected to a four-way valve 21 for changing the refrigerant circulation direction in accordance with the operation mode, a temperature sensor 22 for detecting the temperature of an outdoor heat exchanger (not shown), and an outdoor fan 23 for supplying the wind to the outdoor heat exchanger.

A smoothing capacitor 41 is connected to the output side of the full-wave rectifying circuit 40.

The voltage across the smoothing capacitor 41 is supplied to an inverter 50.

The inverter 50 is connected to the compressor drive motor 60.

The schematic operation of the embodiment of the air conditioner having this arrangement will be described.

Commands such as the operation start, the operation mode, the set room temperature, and the wind speed and wind direction of the indoor fan are sent from the remote controller 3 to the indoor controller 10 via the receiver 4.

In accordance with the commands, the indoor controller 10 displays the operation state and the like on the display 8, and drives and controls the indoor fan 6 and the louver 7.

In accordance with the difference between the set temperature and room temperature, the indoor controller 10 calculates the output frequency (to be referred to as a compressor operation frequency hereinafter) of the inverter 50 for driving the compressor drive motor 60, and transmits a compressor operation frequency designation signal to the outdoor controller 20 together with an operation mode signal.

The outdoor controller 20 excites (or releases excitation of) the four-way valve 21 in accordance with the operation mode signal, controls the inverter 50 in accordance with the compressor operation frequency designation signal, drives the outdoor fan 23, and controls the four-way valve 21 by, e.g., a detection signal from the temperature sensor 22 to perform defrosting.

The outdoor controller 20 also corrects the compressor operation frequency so as to prevent a current detection value by the current detector 13 from exceeding a preset limit value.

The outdoor controller 20 further executes short-circuiting conduction of the AC power supply 1 via the reactor 12 constituting a power conversion apparatus.

In this case, the outdoor controller 20 supplies the above-described boosting pulse and noise reduction pulse to the photocoupler 25 with reference to the zero-crossing point detected by the zero-crossing detector 14.

When an ON signal is supplied from the base drive power supply 24 to the IGBT 305 constituting the booster 30, the booster 30 short-circuits the AC power supply 1 via the reactor 12.

As a result, according to the present invention, an air conditioner capable of improving the power factor of the power supply and making the harmonic component of the power supply match or very closer to the IEC standard can be provided.

In stopping the operation of the air conditioner, the booster 30 kept operating immediately before the stop of the operation applies an excessive voltage to the inverter 50 immediately after the stop of the operation, thereby damaging the circuit element constituting the inverter 50.

In the air conditioner having the booster 30, therefore, in stopping the operation, the short-circuiting conduction operation of the booster is stopped, and then the compressor is stopped.

When a DC voltage obtained by rectifying an AC power supply voltage in 100V class by the voltage doubling/rectifying circuit is converted into an AC voltage by the inverter 50, and the obtained AC voltage is supplied to the compressor drive motor, the input current easily increases to the limit value along with an increase in load of the air conditioner.

Figure 16A:
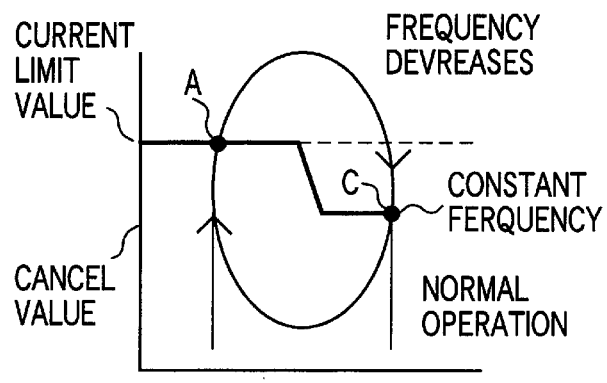
FIG. 16A is an explanatory view for explaining current limitation control in a conventional air conditioner.

For this reason, when the input current exceeds a current limit value A, the conventional apparatus decreases the output frequency of the inverter 50, as shown in FIG. 16A.

When the input current decreases to a cancel value C set smaller than the current limit value, the conventional apparatus returns to a normal operation without limiting the frequency.

The conventional apparatus keeps the output frequency of the inverter 50 constant until the input value decreases to the cancel value after exceeding the limit value.

In this control, however, the output frequency of the inverter 50 decreases after the input current exceeds the limit value. Depending on the load of the air conditioner, hunting occurs such that the input current repeatedly exceeds the limit value A and decreases to the cancel value C or less. As a result, the compressor operation frequency becomes unstable.

Figure 16B:
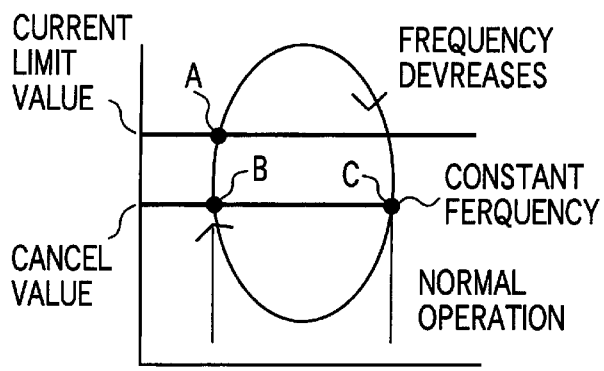
FIG. 16B is an explanatory view for explaining current limitation control in the embodiment of the air conditioner according to the present invention.

To the contrary, in the embodiment of the present invention shown in FIG. 15, 14.5A is used as a constant frequency control start value B and the constant frequency control cancel value C for an input current limit value A of 15A, as shown in FIG. 16B.

When the input current increases over the constant frequency control start value B, the output frequency of the inverter 50, i.e., the compressor operation frequency is maintained at 70 Hz.

In the embodiment of the present invention shown in FIG. 15, if the input current exceeds the limit value A of 15A even while the compressor operation frequency is maintained at 70 Hz, the compressor operation frequency gradually decreases until the input current decreases to 15A or less.

In the embodiment of the present invention shown in FIG. 15, if the input current does not decrease to the cancel value C or less even upon the compressor operation frequency decreasing to 60 Hz, the control returns to a normal operation when the input current reaches the cancel value C while the compressor operation frequency is maintained at 60 Hz.

In this case, the current limit value A and the cancel value B or C have a difference of 0.5A, but may be 1.0A in consideration of the controllability or an appropriate value of 1.0A or less.

In this embodiment, the control shown in FIG. 16B can prevent hunting, i.e., the current from repeatedly exceeding the limit value and decreasing to the cancel value or less.

As is apparent from the above description, according to the present invention, a booster which is series-connected to an reactor on the power supply side and forcibly short-circuits an AC power supply via the reactor is arranged to rectify and smooth an AC voltage supplied from the AC power supply, convert the AC voltage into a DC voltage, convert the DC voltage into an AC voltage, and supply the obtained AC voltage to a load.

In the present invention, the short-circuiting conduction time of the booster is set in accordance with any one or a plurality of differences between the AC power supply voltage, the inductance of the reactor, the circuit arrangement of a conversion section for converting an AC voltage into a DC voltage, and the input power. With this setting, the power factor of the power supply can be increased, and the harmonic component of the power supply can be sufficiently reduced.

According to the present invention, therefore, a power conversion apparatus capable of improving the power factor of the power supply and making the harmonic component of the power supply match or very closer to the IEC standard can be provided.

Further, according to the present invention, an air conditioner using the power conversion apparatus capable of improving the power factor of the power supply and making the harmonic component of the power supply match or very closer to the IEC standard can be provided.

What is claimed is:

1. A power conversion apparatus characterized by comprising:
   a conversion section for rectifying and smoothing an AC voltage supplied from an AC power supply and converting the AC voltage into a DC voltage;
   an inversion section for converting the DC voltage prepared by conversion by said conversion section into an AC voltage and supplying the AC voltage to a load;
   a reactor series-connected to the AC power supply side in said conversion section, said reactor having an inductance of 4 to 20 mH;
   a booster for forcibly short-circuiting the AC power supply via said reactor; and a controller for controlling a short-circuiting conduction time of the AC power supply by said booster, within a range of 1.5 to 3.5 msec so as to optimize a power factor of the AC power supply.

2. A power conversion apparatus according to claim 1, characterized in that when the AC power supply voltage is in 100V class, the inductance of said reactor is 4 to 8 mH, said conversion section comprises a voltage doubling/rectifying circuit and a voltage doubling capacitor having a capacitance of 600 to 1,000 $\mu$F, and the input power is not more than 2,000 W, said controller controls the short-circuiting conduction time of the AC power supply within a range of 1.5 to 3.5 msec.

3. A power conversion apparatus according to claim 1, characterized in that when the AC power supply voltage is in 200V class, the inductance of said reactor is 8 to 20 mH, said conversion section comprises a full-wave rectifying circuit and a smoothing capacitor having a capacitance of 1,400 to 1,800 $\mu$F, and the input power is not more than 2000 W, said controller controls the short-circuiting conduction time of the AC power supply within a range of 1.5 to 3.5 msec.

4. A power conversion apparatus according to claim 1, characterized in that when the AC power supply voltage is in 200V or 230V class, and the input power is 2,000 to 4,000 W, said reactor has an inductance of 14 to 20 mH.

5. A power conversion apparatus according to claim 4, characterized in that said reactor has an inductance of 16 mH, and said controller controls the short-circuiting time of the AC power supply within a range of about 2.0 to 2.5 msec for an input power of 2000 W, within a range of about 3.0 to 3.5 msec for an input power of 4,000 W, and for only a time obtained by linearly interpolating the short-circuiting conduction time for an intermediate input power of 2,000 to 4,000 W.

6. A power conversion apparatus according to claim 1, characterized in that said reactor includes a plurality of reactors substantially equal in at least one of a shape, an inductance, and a natural frequency so as to obtain a predetermined synthesized inductance upon series connection.

7. A power conversion apparatus according to claim 6, characterized in that when the AC power supply is in 200V class, and the input power is 2,000 to 4,000 W, said plurality of reactors have a synthesized inductance of 14 to 20 mH.

8. A power conversion apparatus according to claim 6, characterized in that said reactor includes first and second reactors substantially equal in inductance and natural frequency, said first reactor is connected to one power supply path for connecting said conversion section to the AC power supply, and said second reactor is connected to the other power supply path for connecting said conversion section to the AC power supply.

9. A power conversion apparatus according to claim 7, characterized in that said reactor includes first and second reactors having substantially equal in inductance and natural frequency, said first reactor is connected to one power supply path for connecting said conversion section to the AC power supply, and said second reactor is connected to the other power supply path for connecting said conversion section to the AC power supply.

10. A power conversion apparatus according to any one of claims 1 to 9, characterized in that after said booster short-circuits the AC power supply for a predetermined time, said booster short-circuits the AC power supply again for only a time shorter than the predetermined time.

11. An air conditioner characterized by driving a compressor for forming a refrigeration cycle using said power conversion apparatus defined in any one of claims 1 to 9.

12. An air conditioner according to claim 11, characterized in that the compressor stops after a short-circuiting conduction operation of said booster stops in stopping operation.

13. An air conditioner according to claim 11, characterized in that said air conditioner comprises current detection means for detecting an input current supplied from the AC power supply, said controller decreases a power supply frequency for driving the compressor when the input current detected by said current detection means exceeds a predetermined limit value, and an interval in which a frequency is kept constant using the limit value as an upper limit is set on a side having a current smaller than the limit value.

14. An air conditioner according to claim 12, characterized in that said air conditioner comprises current detection means for detecting an input current supplied from the AC power supply, said controller decreases a power supply frequency for driving the compressor when the input current detected by said current detection means exceeds a predetermined limit value, and an interval in which a frequency is kept constant using the limit value as an upper limit is set on a side having a current smaller than the limit value.

15. An air conditioner according to claim 13, characterized in that a lower limit of the interval in which the frequency is kept constant serves as constant frequency control start and cancel points.

16. An air conditioner according to claim 14, characterized in that a lower limit of the interval in which the frequency is kept constant serves as constant frequency control start and cancel points.

17. An air conditioner characterized by driving a compressor for forming a refrigeration cycle using said power conversion apparatus defined in claim 10.

18. An air conditioner according to claim 17, characterized in that the compressor stops after a short-circuiting conduction operation of said booster stops in stopping operation.

19. An air conditioner according to claim 17, characterized in that said air conditioner comprises current detection means for detecting an input current supplied from the AC power supply, said controller decreases a power supply frequency for driving the compressor when the input current detected by said current detection means exceeds a predetermined limit value, and an interval in which a frequency is kept constant using the limit value as an upper limit is set on a side having a current smaller than the limit value.

20. An air conditioner according to claim 18, characterized in that said air conditioner comprises current detection means for detecting an input current supplied from the AC power supply, said controller decreases a power supply frequency for driving the compressor when the input current detected by said current detection means exceeds a predetermined limit value, and an interval in which a frequency is kept constant using the limit value as an upper limit is set on a side having a current smaller than the limit value.

21. An air conditioner according to claim 19, characterized in that a lower limit of the interval in which the frequency is kept constant serves as constant frequency control start and cancel points.

22. An air conditioner according to claim 20, characterized in that a lower limit of the interval in which the frequency is kept constant serves as constant frequency control start and cancel points.

* * * * *